US012647709B2

(12) United States Patent
Kim

(10) Patent No.: US 12,647,709 B2
(45) Date of Patent: Jun. 2, 2026

(54) GRADUAL VIBRATION SPEAKER

(71) Applicant: ESTEC CORPORATION, Yangsan-si (KR)

(72) Inventor: Jeong Wook Kim, Dongnae-gu (KR)

(73) Assignee: ESTEC CORPORATION, Gyeongsangnam-do (KR)

( * ) Notice: Subject to any disclaimer, the term of this patent is extended or adjusted under 35 U.S.C. 154(b) by 126 days.

(21) Appl. No.: 18/724,041

(22) PCT Filed: Apr. 5, 2023

(86) PCT No.: PCT/KR2023/004563

§ 371 (c)(1),
(2) Date: Jun. 25, 2024

(87) PCT Pub. No.: WO2023/195756

PCT Pub. Date: Oct. 12, 2023

(65) Prior Publication Data

US 2025/0097618 A1 Mar. 20, 2025

(30) Foreign Application Priority Data

Apr. 7, 2022 (KR) ........................ 10-2022-0043166

(51) Int. Cl.

| | |
|---|---|
| ***H04R 1/02*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............. *H04R 1/028* (2013.01); *H04R 9/025* (2013.01); *H04R 9/045* (2013.01); *H04R 9/06* (2013.01); *H04R 2400/11* (2013.01)

(58) Field of Classification Search

CPC ........ H04R 1/028; H04R 9/025; H04R 9/045; H04R 9/06; H04R 2400/11
USPC .......................................................... 381/162
See application file for complete search history.

(56) References Cited

U.S. PATENT DOCUMENTS

2021/0321200 A1* 10/2021 Kim ........................ H04R 7/04

FOREIGN PATENT DOCUMENTS

| | | | | | |
|---|---|---|---|---|---|
| JP | 2006-311255 | A | | 11/2006 | |
| JP | 2017-079375 | A | | 4/2017 | |
| KR | 20090082999 | A | * | 8/2009 | H04R 9/02 |
| KR | 10-2011-0006830 | A | | 1/2011 | |
| KR | 10-2013-0112267 | A | | 10/2013 | |
| KR | 10-2016-0020659 | A | | 2/2016 | |
| KR | 10-2115387 | B1 | | 5/2020 | |

OTHER PUBLICATIONS

International Search Report from corresponding PCT Application No. PCT/KR2023/004563, dated Jul. 12, 2023.

* cited by examiner

*Primary Examiner* — Sean H Nguyen
(74) *Attorney, Agent, or Firm* — Harness, Dickey & Pierce, P.L.C.

(57) ABSTRACT

The present invention comprises: a magnetic circuit module forming a magnetic gap; a voice coil part which is disposed in the magnetic gap and vibrates along a vibration axis; and an excitation module which is connected to the voice coil part and includes a shaft extending along the vibration axis, wherein the volume of a speaker is minimized and the position relative to a vibrated object can be changed to select the desired sound quality.

11 Claims, 9 Drawing Sheets

GRADUAL VIBRATION SPEAKER

CROSS-REFERENCE TO RELATED APPLICATIONS

This application is a national phase application of PCT Application No. PCT/KR2023/004563, filed on Apr. 5, 2023, which claims the benefit and priority to Korean Patent Application No. 10-2022-0043166, filed on Apr. 7, 2022. The entire disclosures of the applications identified in this paragraph are incorporated herein by references.

TECHNICAL FIELD

The present invention relates to a point vibration speaker, and more particularly, to a point vibration speaker which is minimized in volume and enables a user to select sound quality.

BACKGROUND ART

A speaker is referred as a megaphone or a loudspeaker. In a speaker according to the related art, a voice coil vertically vibrates with an electromagnetic force generated by an interaction between a magnetic force of a magnetic circuit and a magnetic field of the voice coil. The voice coil is coupled to a vibration plate, and thus, excites the vibration plate. The vibration plate propagates sound energy with a vibration through peripheral air.

In the speaker of the related art, it may be unable to generate a sound wave in air by vibrating only the voice coil, and due to this, it may be unable to generate a sound. Therefore, the vibration plate is necessary for propagating sound energy. However, when the speaker is operating, a wavelength propagated forward from the vibration plate has a phase opposite to a phase of a wavelength propagated backward from the vibration plate, and thus, energy is offset to be dissipated. To solve such a problem, in the speaker of the related art, the speaker is installed in a case having a box shape and is thus commercialized. As a result, according to the related art, a size (volume) of a speaker should be large, causing inconvenience in use.

DISCLOSURE

Technical Problem

An embodiment of the present invention is for providing a point vibration speaker which may be minimized in volume to enhance the convenience of use and may enable a selection of desired sound quality.

Technical Solution

To accomplish the above-described objects, a point vibration speaker according to an embodiment of the present invention includes a magnetic circuit module forming a magnetic gap, a voice coil unit disposed in the magnetic gap to vibrate along a vibration axis, and an excitation module connected to the voice coil unit, the excitation module including a shaft extending along the vibration axis.

Moreover, the excitation module further includes a supporter connected to the shaft and the voice coil unit, and the supporter includes a voice coil coupler coupled to the voice coil unit, a shaft coupler coupled to the shaft, and an extension portion connected to the voice coil coupler and the shaft coupler.

Moreover, the extension portion progressively converges toward the shaft coupler from the voice coil coupler.

Moreover, the extension portion includes a through hole.

Moreover, the point vibration speaker further includes a frame supporting the magnetic circuit module and an elastic member connected to the frame and the voice coil unit.

Moreover, the elastic member is a plate spring.

the shaft includes a convergence part converging toward the vibration axis in a direction from a lower end thereof to an upper end thereof.

Moreover, the shaft and the supporter are formed as one body.

Moreover, the magnetic circuit module includes a yoke, a magnet disposed on the yoke, and a pole piece disposed on the magnet.

Moreover, the yoke includes a floor portion and a sidewall portion extending in the vibration axis from the floor portion, and the magnet and the pole piece are disposed inward from the sidewall portion.

Moreover, the yoke includes a floor portion and a sidewall portion extending in the vibration axis from the floor portion, and the magnet and the pole piece are disposed outward from the sidewall portion.

Moreover, the shaft contacts a vibration object to excite the vibration object.

Advantageous Effect

According to the present invention, because a vibration plate is removed, a volume (size) of a speaker may be minimized.

Moreover, a sound (sound quality) may be controlled based on a characteristic of a vibration object contacting a shaft and a contact position of the vibration object.

Moreover, a user may select sound quality (sound).

MODE FOR INVENTION

Figure 1:
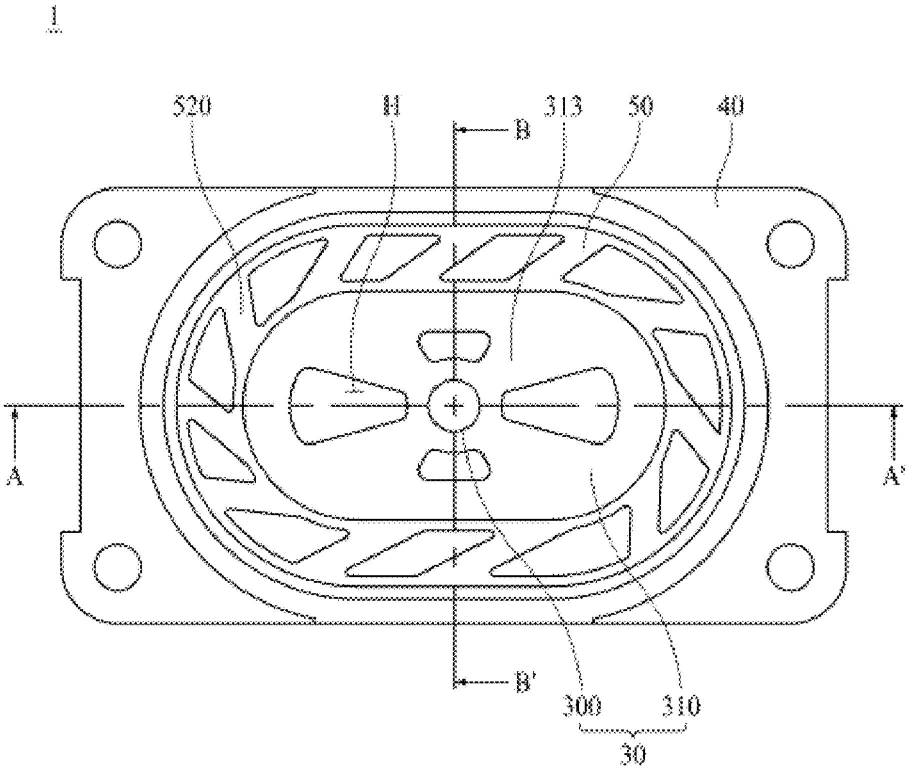
FIG. 1 is a plan view schematically illustrating a point vibration speaker according to an embodiment of the present invention.

Like reference numerals refer to like elements throughout. In the below description, elements and functions that are irrelevant to the essentials of the invention and have been known to those skilled in the art may be omitted. Meanings of the terms described herein should be understood as follows.

Advantages and features of the invention, and implementation methods thereof will be clarified through following embodiments described with reference to the accompanying drawings. The invention may, however, be embodied in different forms and should not be construed as limited to the embodiments set forth herein. Rather, these embodiments are provided so that this invention will be thorough and complete, and will fully convey the scope of the invention to those skilled in the art. Furthermore, the invention is only defined by scopes of claims.

A shape, a size, a ratio, an angle, and a number disclosed in the drawings for describing embodiments of the invention are merely an example, and thus, the invention is not limited to the illustrated details. Like reference numerals refer to like elements throughout. In the following description, when the detailed description of the relevant known technology is determined to unnecessarily obscure the important point of the invention, the detailed description will be omitted.

In a case where 'comprise', 'have', and 'include' described herein are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An "X-axis direction", a "Y-axis direction", and a "Z-axis direction" should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the invention may be partially or overall coupled to or combined with each other, and may be variously inter-operated with each other and driven technically as those skilled in the art can sufficiently understand. The embodiments of the invention may be carried out independently from each other, or may be carried out together in co-dependent relationship.

Hereinafter, a point vibration speaker 1 according to an embodiment of the present invention will be described in detail with reference to the accompanying drawings.

Figure 2:
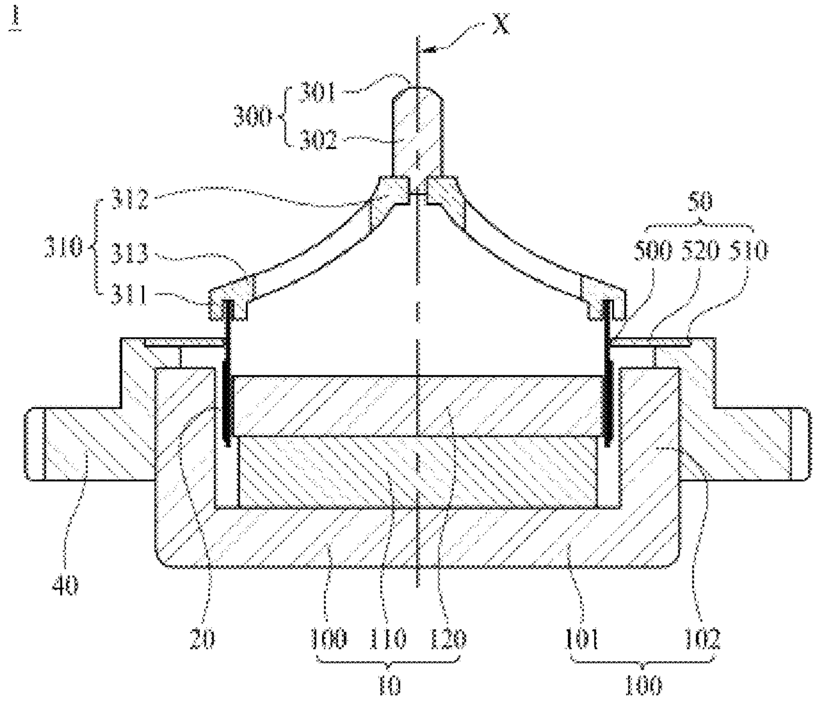
FIG. 2 is a cross-sectional view taken along line A-A' in FIG. 1.

FIG. 1 is a plan view schematically illustrating a point vibration speaker 1 according to an embodiment of the present invention. FIG. 2 is a cross-sectional view taken along line A-A' in FIG. 1. FIG. 2 is a cross-sectional view taken along line B-B' in FIG. 1.

Figure 3:
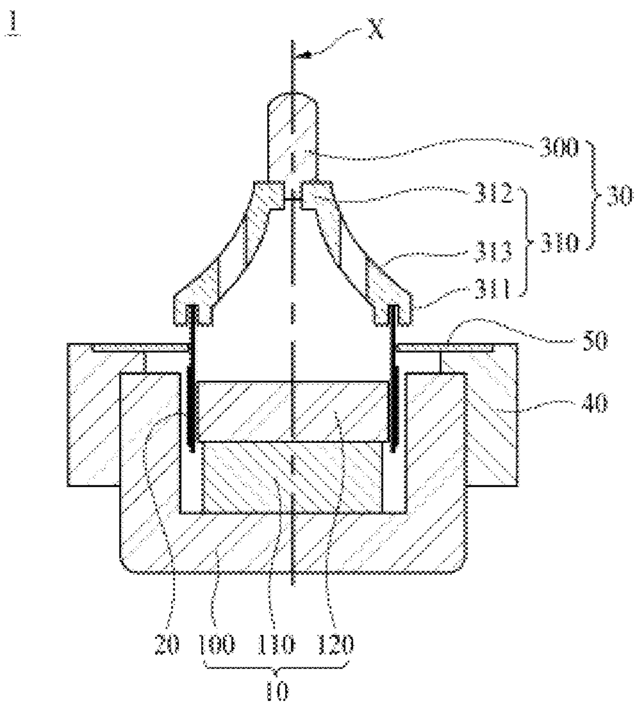
FIG. 3 is a cross-sectional view taken along line B-B' in FIG. 1.

Referring to FIGS. 1 to 3, the point vibration speaker 1 according to an embodiment of the present invention is disposed in a vibration object and is for generating a sound wave through the vibration object, without a vibration plate for generating a sound wave. The point vibration speaker 1 according to an embodiment of the present invention includes a magnetic circuit module 10, a voice coil unit 20, and an excitation module 30.

The magnetic circuit module 10 forms a magnetic gap to allow a magnetic field to concentrate on the magnetic gap. The voice coil unit 20 is disposed in the magnetic gap and vibrates in a vibration axis X. The excitation module 30 is connected to the voice coil unit 20. The excitation module 30 is vibrated by the voice coil unit 20 to excite a vibration object (a table in FIG. 8). A sound wave (sound) may be generated by a vibration of the vibration object. The excitation module 30 includes a shaft 300. The shaft 300 is disposed in the vibration axis X and extends in the vibration axis X. A center axis of the shaft 300 may be the same as the vibration axis X. Therefore, vibration distortion is prevented, and thus, sound performance is improved. The shaft 300 may be disposed to contact the vibration object, on the vibration object (the table in FIG. 8). The shaft 300 may excite the vibration object with the vibration. The voice coil unit 20 may include a bobbin and a voice coil. The voice coil is wound around the bobbin. The voice coil may vibrate through an electromagnetic interaction with the magnetic circuit module, based on a current applied to the voice coil.

The excitation module 30 may further include a supporter 310. The supporter 310 is connected to the shaft 300 and the voice coil unit 20. The supporter 310 may allow a vibration of the voice coil unit 20 to converge to and concentrate on the shaft 300. Accordingly, the shaft 300 is disposed at a center of the supporter 310 in a plane. The shaft 300 contacts a certain position of the vibration object to excite the vibration object. In this case, the shaft 300 may point-contact the vibration object.

In an embodiment, the supporter 310 may include a voice coil coupler 311, a shaft coupler 312, and an extension portion 313. The voice coil coupler 311 is coupled to the voice coil unit 20. The shaft coupler 312 is coupled to the shaft 300. The extension portion 313 is connected to the voice coil coupler 311 and the shaft coupler 312. The supporter 310 converges toward the vibration shaft X in a direction from the voice coil coupler 311 to the shaft coupler 312. That is, the supporter 310 may have a slope portion. Accordingly, a vibration by the voice coil unit 20 may converge to and concentrate on the shaft 300.

The voice coil coupler 311 may be coupled to the voice coil unit 20 by an adhesive material. The shaft 300 may be at least partially inserted into the shaft coupler 312 and may be forcibly fitted to the shaft coupler 312. The shaft 300 may be coupled to the shaft coupler 312 by simultaneously applying a plurality of methods. The extension portion 313 progressively converges toward the shaft coupler 312 from the voice coil coupler 311. The extension portion 313 allows a vibration to converge to the shaft 300. Therefore, a vibration plate for generating a sound wave is not needed. The vibration plate should enlarge as sound performance is enhanced, but the present invention does not need the vibration plate and thus is good in miniaturization. Furthermore, the extension portion 313 does not generate a sound wave but transfers a vibration to the shaft 300, and thus, may include a plurality of through holes H. Accordingly, an air resistance may decrease when the extension portion 313 is vibrating, and thus, sound performance may increase. Also, a weight of the speaker 1 may decrease. The plurality of through holes H may be disposed to be symmetric with respect to the vibration axis X in a plane. This is associated with the prevention of sound distortion.

Furthermore, the voice coil coupler 311 extends to form a closed loop in a plane. The shaft coupler 312 is disposed inward from the voice coil coupler 311 in a plane. Therefore, a vibration of the voice coil unit 20 configuring a certain closed loop may converge to the shaft 300. At least a portion of the voice coil coupler 311 may extend downward along the vibration axis X at an outer side of the voice coil unit 20. Accordingly, the voice coil coupler 311 may support at least a portion of an outer circumference surface of the voice coil unit 20 and may thus be stably fixed.

The shaft 300 may include a convergence part 301 and a body part 302. The body part 302 is connected to the supporter 310. The shaft 300 may extend in a circumference direction with respect to the vibration axis X. The convergence part 301 converges toward the vibration axis X in a direction from a lower end of the shaft 300 to an upper end of the shaft 300. That is, the convergence part 301 gets closer to the vibration axis X. Therefore, the convergence part 301 may apply a point contact and a point vibration to the vibration object (the table in FIG. 8). In an embodiment, the convergence part 301 may include a curved surface which is convex in a direction distancing from the supporter 310. Accordingly, a vibration of the voice coil unit 20 is changed to a point vibration at an endmost portion of the convergence part 301.

The point vibration speaker 1 according to an embodiment of the present invention may further include a frame 40 and an elastic member 50. The frame 40 may at least support the magnetic circuit module 10. The elastic member 50 may be connected to the frame 40 and the voice coil unit 20. The elastic member 50 supports a vibration of the voice coil unit 20. The elastic member 50 may be a plate spring. The elastic member 50 may be a metal material. The elastic member 50 may be disposed in the same plane.

The elastic member 50 may include a first coupler 500, a second coupler 510, and a supporting part 520. The first coupler is coupled to the voice coil unit 20. The second coupler 510 may be coupled to the frame 40 or the magnetic circuit module 10. The first coupler 500 and the second coupler 510 may be bonded to each other by an adhesive material. The supporting part 520 is connected to the first coupler 500 and the second coupler 510. The supporting part 520 is disposed in plurality, and the plurality of supporting parts 520 are spaced apart from one another. An uppermost surface of each of the first coupler 500, the second coupler 510, and the supporting part 520 may be disposed in the same plane. Also, a lowermost surface of each of the first coupler 500, the second coupler 510, and the supporting part 520 may be disposed in the same plane. That is, the elastic member 50 may have the same thickness in all directions toward an outer side thereof from an inner side thereof.

Figure 4:
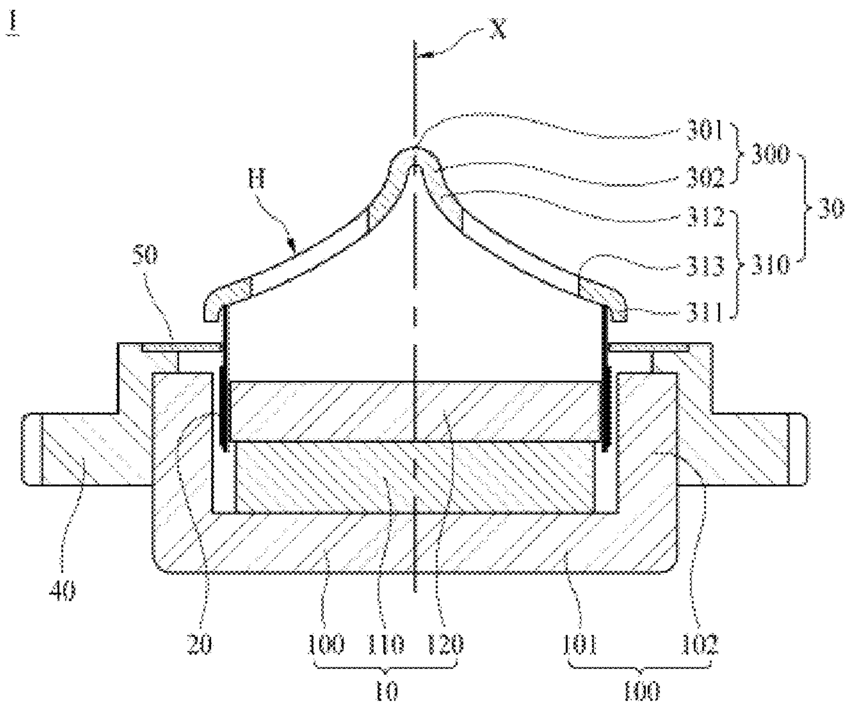
FIGS. 4 and 5 are diagrams schematically illustrating another embodiment of an excitation module illustrated in FIGS. 2 and 3.
Figure 5:
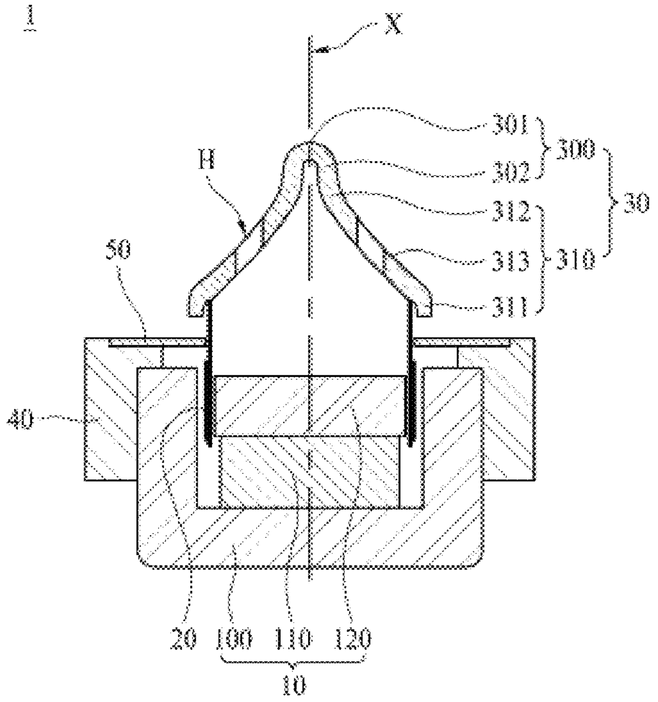

FIGS. 4 and 5 are diagrams schematically illustrating another embodiment of the excitation module 30 illustrated in FIGS. 2 and 3.

Referring to FIGS. 4 and 5, the shaft 300 and the supporter 310 may be manufactured as one body and may be formed as one body. That is, the shaft 300 and the supporter 310 may not include coupling surfaces which are physically separated from each other. To this end, the shaft 300 and the supporter 310 may be manufactured by injection.

In this case, the shaft 300 is disposed at an uppermost end of the supporter 310. The shaft 300 includes a body part 302 and a convergence part 301. The body part 302 is connected to the supporter 310. The shaft coupler 312 may be defined between the body part 302 and the supporter 310. The convergence part 301 converges to be closer to the vibration axis X in a direction from the supporter 310 to the body part 302. In an embodiment, the convergence part 301 may include an outer curved surface which is convex upward from the supporter 301. Also, the shaft 300 may include an inner curved surface which has a shape corresponding to the outer curved surface of the convergence part 301. The inner curved surface may be disposed under the outer curved surface.

Figure 6:
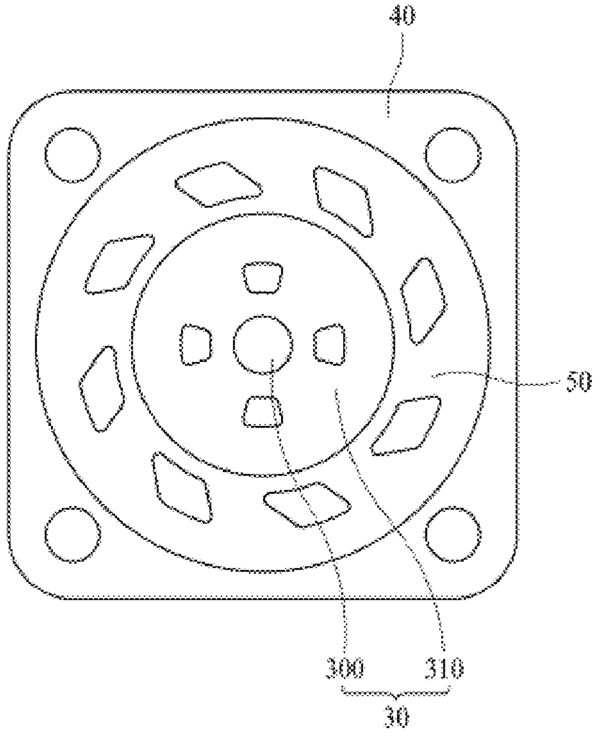
FIG. 6 is a diagram illustrating another embodiment of the point vibration speaker illustrated in FIG. 1.

FIG. 6 is a diagram illustrating another embodiment of the point vibration speaker 1 illustrated in FIG. 1.

Referring to FIGS. 1 to 6, the point vibration speaker 1 according to an embodiment of the present invention may configure a closed loop which extends along a certain trajectory with respect to the vibration axis X which is a center axis. In detail, an edge of the supporter 301, the elastic member 50, the magnetic circuit module 20, and an inner circumference surface of the frame 40 may configure a closed loop which is a trajectory having a long axis and a short axis. Therefore, it is possible to dispose on a long and narrow surface, and a strong driving force may be implemented. In another embodiment, the point vibration speaker 1 of the present invention may extend in a circumference direction with respect to the vibration axis X. In detail, the edge of the supporter 301, the elastic member 50, the magnetic circuit module 20, and the inner circumference surface of the frame 40 may extend in a circular shape.

The magnetic circuit module 20 includes a yoke 100, a magnet 110, and a pole piece 120. The magnet 110 is disposed on the yoke 100. The pole piece 120 is disposed on the magnet 110. The yoke 100 includes a floor portion 101 and a sidewall portion 102. The sidewall portion 102 extends in the vibration axis X from the floor portion 101. A magnetic gap is formed between the sidewall portion 102 and the pole piece 120 and between the sidewall 102 and the magnet 110. In an embodiment, the magnet 110 and the pole piece 120 may be disposed inward from the sidewall portion 102. That is, the sidewall portion 102 may be disposed to surround the magnet 110 and the pole piece 120.

Figure 7:
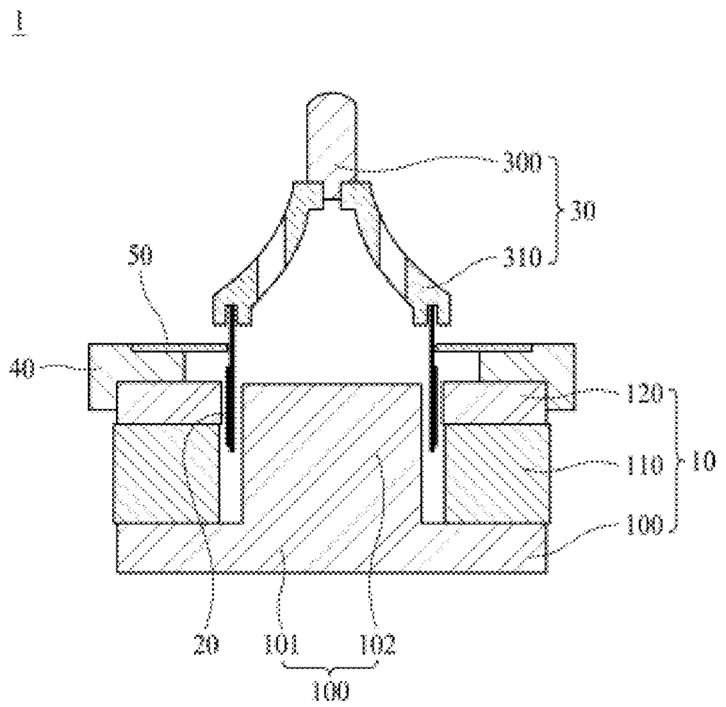
FIG. 7 is a diagram illustrating another embodiment of a magnetic circuit module illustrated in FIG. 2.

FIG. 7 is a diagram illustrating another embodiment of the magnetic circuit module 20 illustrated in FIG. 2.

Referring to FIG. 7, the yoke 100 includes a floor portion 101 and a sidewall portion 102 which extends from the floor portion 101 in parallel with the vibration axis X. In this case, the sidewall portion 102 is disposed at a center of the floor portion 101. That is, an edge of the floor portion 101 may be disposed to surround an outer circumference surface of the sidewall portion 102. In this case, the sidewall portion 102 is disposed inward from the magnet 110 and the pole piece 120.

Figure 8:
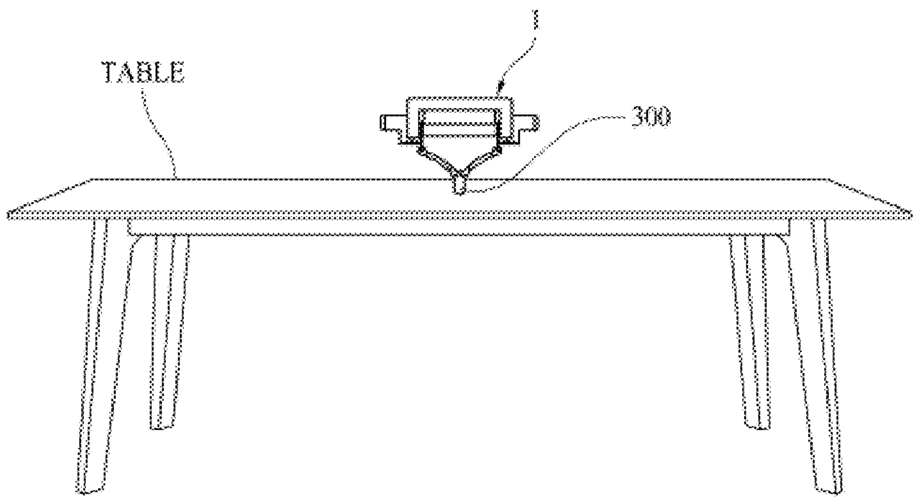
FIGS. 8 and 9 are diagrams illustrating a use example of the point vibration speaker illustrated in FIG. 1.
Figure 9:
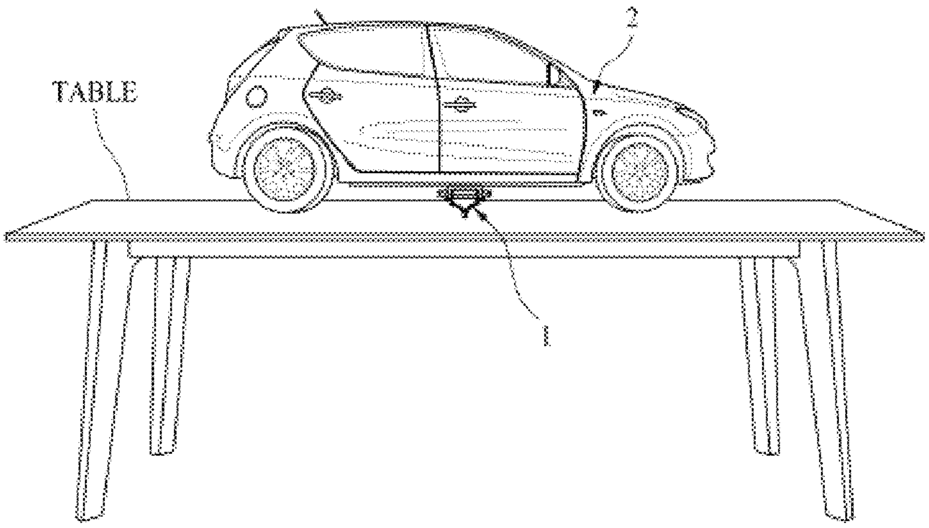

FIGS. 8 and 9 are diagrams illustrating a use example of the point vibration speaker 1 illustrated in FIG. 1. The point vibration speaker 1 according to an embodiment of the present invention may be disposed to contact a vibration object (a table, a desk, a television (TV) cover, etc.). In this case, the shaft 300 contacts and excites the vibration object to generate a sound. A sound (sound quality) may vary based on a material and a thickness of the vibration object. Accordingly, a user may change a contact position of the vibration object to select (set) desired sound quality. That is, there is an effect where sound quality is not defined but is capable of being selected by a consumer (a user).

The point vibration speaker 1 may be individually installed in the vibration object, or may be supported by a supporting assistance object 2. The point vibration speaker 1 may be attached on a floor of the supporting assistance object 2 such as a cup or a toy and may be disposed on the vibration object. In this case, the shaft 300 may be adhered to the vibration object by an appropriate load, and thus, the stability of a vibration may be enhanced.

Hereinabove, the invention implemented by the inventor has been described in detail according to the embodiment, but the present invention is not limited to the embodiment and it is obvious that the present invention may be variously modified within a range which does not deviate from the gist.

What is claimed is:

1. A point vibration speaker comprising:

a magnetic circuit module forming a magnetic gap;

a voice coil unit disposed in the magnetic gap to vibrate along a vibration axis; and an excitation module connected to the voice coil unit, the excitation module including a shaft extending along the vibration axis, wherein the excitation module further comprises a supporter connected to the shaft and the voice coil unit, and wherein the supporter comprises:

a voice coil coupler coupled to the voice coil unit;

a shaft coupler coupled to the shaft; and an extension portion connected to the voice coil coupler and the shaft coupler.

2. The point vibration speaker of claim 1, wherein the extension portion progressively converges toward the shaft coupler from the voice coil coupler.

3. The point vibration speaker of claim 1, wherein the extension portion comprises a through hole.

4. The point vibration speaker of claim 1, further comprising:

a frame supporting the magnetic circuit module; and an elastic member connected to the frame and the voice coil unit.

5. The point vibration speaker of claim 4, wherein the elastic member is a plate spring.

6. The point vibration speaker of claim 1, wherein the shaft comprises a convergence part converging toward the vibration axis in a direction from a lower end thereof to an upper end thereof.

7. The point vibration speaker of claim 1, wherein the shaft and the supporter are formed as one body.

8. The point vibration speaker of claim 1, wherein the magnetic circuit module comprises:

a yoke;

a magnet disposed on the yoke; and a pole piece disposed on the magnet.

9. The point vibration speaker of claim 8, wherein the yoke comprises a floor portion and a sidewall portion extending in the vibration axis from the floor portion, and the magnet and the pole piece are disposed inward from the sidewall portion.

10. The point vibration speaker of claim 8, wherein the yoke comprises a floor portion and a sidewall portion extending in the vibration axis from the floor portion, and the magnet and the pole piece are disposed outward from the sidewall portion.

11. The point vibration speaker of claim 1, wherein the shaft contacts a vibration object to excite the vibration object.

* * * * *